United States Patent [19]

Gregg et al.

[11] Patent Number: 5,559,963
[45] Date of Patent: Sep. 24, 1996

[54] SUSPENDING, RESUMING, AND INTERLEAVING FRAME-GROUPS

[75] Inventors: Thomas A. Gregg, Highland; Joseph M. Hoke, Millerton; Kulwant M. Pandey, Lagrangeville, all of N.Y.

[73] Assignee: International Business Machines Corporation, Armonk, N.Y.

[21] Appl. No.: 148,113

[22] Filed: Nov. 4, 1993

Related U.S. Application Data

[63] Continuation-in-part of Ser. No. 839,986, Feb. 20, 1992, Pat. No. 5,267,240.

[51] Int. Cl.$^6$ ................................. H04L 5/00; H04L 7/00
[52] U.S. Cl. .............. 395/200.13; 395/306; 364/DIG. 1; 364/262.5; 364/DIG. 2; 364/935; 364/935.56; 364/935.7; 364/942.1; 364/972.79
[58] Field of Search ........................ 395/200.13, 200.17, 395/200.14, 306; 371/1

[56] References Cited

U.S. PATENT DOCUMENTS

| | | | |
|---|---|---|---|
| 4,777,595 | 10/1988 | Strecker et al. | 395/200.17 |
| 4,797,951 | 1/1989 | Duxbury et al. | 359/158 |
| 4,866,609 | 9/1989 | Calta et al. | 395/250 |
| 4,984,251 | 1/1991 | Perloff et al. | 370/100.1 |
| 5,003,558 | 3/1991 | Gregg et al. | 375/108 |
| 5,025,458 | 6/1991 | Casper et al. | 375/114 |
| 5,179,555 | 1/1993 | Videlock et al. | 370/85.13 |
| 5,206,933 | 4/1993 | Farrel et al. | 395/200.2 |
| 5,210,749 | 5/1993 | Firoozmand | 370/85.1 |
| 5,267,240 | 11/1993 | Bartow et al. | 371/1 |
| 5,287,456 | 2/1994 | Rhodes et al. | 395/200.01 |
| 5,301,308 | 4/1994 | Daar et al. | 395/182.1 |
| 5,323,385 | 6/1994 | Jurewicz et al. | 370/43 |

*Primary Examiner*—Thomas C. Lee
*Assistant Examiner*—D. Dinh
*Attorney, Agent, or Firm*—Lynn L. Augspurger

[57] ABSTRACT

A system and method for asynchronously transmitting data blocks, in parallel, across multiple fibers in a serial manner. Frame groups are provided as a mechanism to transmit associated data serially on each fiber and tie the data being transmitted together. The frame groups can be prematurely ended on any 256 byte block boundary for several purposes, and all the frames of a given group must contain the same number of information field data words. Allowing frame groups to be ended on arbitrary block boundaries allows their transmission to start before all of the information field for the frame group has been received from a shared main processor storage. This capability of ending frame groups also allows high priority frame groups to interrupt the transmission of a relatively long data frame. Finally, the capability to end the frame group protects the information field of a stalled frame group since the CRC is sent and the idle sequence is resumed. Using multiple, independently clocked transmitters improves the fault tolerance of the link but also makes it difficult to end all frame of the frame group on the same block boundary. This problem is also solved by keeping track of the data sent to the multiple transmit buffers.

27 Claims, 10 Drawing Sheets

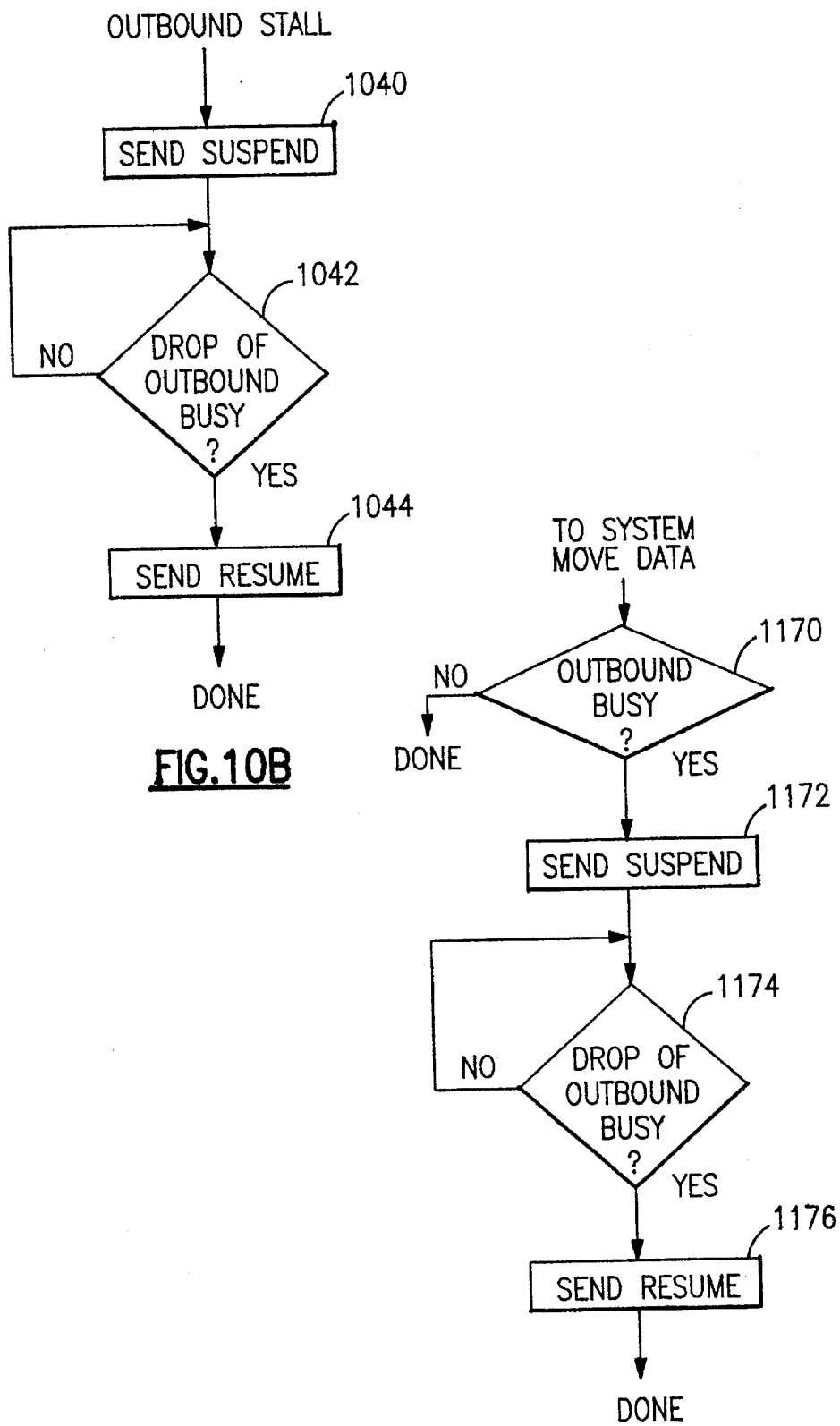

SUSPENDING, RESUMING, AND INTERLEAVING FRAME-GROUPS

This application is a continuation-in-part of U.S. Ser. No. 07/839,986, filed Feb. 20, 1992, by Bartow et al., now U.S. Pat. No. 5,267,240, issued Nov. 30, 1993, entitled FRAME-GROUP TRANSMISSION AND RECEPTION FOR PARALLEL/SERIAL BUSES.

FIELD OF THE INVENTION

The present invention relates to data communications systems. More particularly, the present invention relates to data communication systems using optical fibers to carry information.

CROSS REFERENCE TO RELATED APPLICATIONS

This application contains subject matter which is related to the following U.S. patent applications, and while of more general applicability is an improvement which can be used in connection with these related inventions. Many of these referenced applications have been published in corresponding European and or Japanese applications as of the filing date of this application, but the numbers thereof have not been identified as of the filing of this application. They are:

"Configurable, Recoverable Parallel Bus" by N. G. Bartow et al, Ser. No. 07/839,657, filed Feb. 20, 1992; (now U.S. Pat. No. 5,357,608, granted Oct. 18, 1994);

"High Performance Intersystem Communications For Data Processing Systems" by N. G. Bartow et al. Ser. No. 07/839,652, filed Feb. 20, 1992; (now U.S. Pat. No. 5,412,803, granted May 2, 1995);

"Frame-Group Transmission And Reception For Parallel/Serial Buses", by N. G. Bartow, et al, Ser. No. 839,986, filed Feb. 20, 1992; (now U.S. Pat. No. 5,267,240, granted Nov. 30, 1993);

"Method and Apparatus for Distributed Locking of Shared Data, Employing a Central Coupling Facility" by D. A. Elko et al, Ser. No. 07,860,808, filed Mar. 30, 1992; (now U.S. Pat. No. 5,339,427, granted Aug. 16, 1994);

"Communicating Messages Between Processors And A Coupling Facility" by D. A. Elko et al, Ser. No. 07/860,380, filed Mar. 30, 1992; (now abandoned);

"Sysplex Shared Data Coherency Method and Means" by D. A. Elko et al, Ser. No. 07/860,805, filed Mar. 30, 1992; (pending);

"Command Quiesce Function" by D. A. Elko et al, Ser. No. 07/860,330, filed Mar. 30, 1992; (now U.S. Pat. No. 5,339,405, granted Aug. 16, 1994);

"Storage Management For a Shared Electronic Storage Cache" by D. A. Elko et al, Ser. No. 07/860,807, filed Mar. 30, 1992; (now U.S. Pat. No. 5,457,793, granted Oct. 10, 1995);

"Management Of Data Movement From A SES Cache To DASD" by D. A. Elko et al, Ser. No. 07/860,806, filed Mar. 30, 1992; (pending);

"Command Retry System" by D. A. Elko et al, Ser. No. 07/860.378, filed Mar. 30, 1992; (now U.S. Pat. No. 5,392,397, granted Feb. 21, 1995);

"Integrity Of Data Objects Used To Maintain State Information For Shared Data At A Local Complex" by D. A. Elko et al, Ser. No. 07/860,800, filed Mar. 30, 1992; (now U.S. Pat. No. 5,331,673, granted Jul. 19, 1994);

"Management Of Data Objects Used To Maintain State Information For Shared Data At A Local Complex" by J. A. Frey et al, Ser. No. 07/860,797, filed Mar. 30, 1992; (now U.S. Pat. No. 5,388,266, granted Feb. 7, 1995);

"Recovery Of Data Objects Used To Maintain State Information For Shared Data At A Local Complex" by J. A. Frey et al, Ser. No. 07/860,647, filed Mar. 30, 1992; (now U.S. Pat. No. 5,394.,542, granted Feb. 28, 1995);

"Message Path Mechanism For Managing Connections Between Processors And A Coupling Facility" by D. A. Elko et al, Ser. No. 860,846, filed Mar. 30, 1992; (continued U.S. Ser. No. 08/321,447, Apr. 11, 1995, now U.S. Pat. No. 5,394,542, granted Feb. 28, 1995);

"Method And Apparatus For Notification Of State Transitions For Shared Lists of Data Entries" by J. A. Frey, et al., Ser. No. 07/860,809, filed Mar. 30, 1992; (now U.S. Pat. No. 5,390,328, granted Feb. 14, 1995);

"Method And Apparatus For Performing Conditional Operations on Externally Shared Data" by J. A. Frey, et al., Ser. No. 07/860,655, filed Mar. 30, 1992; (now abandoned);

"Apparatus And Method For List Management In A Coupled DP System" by J. A. Frey, et al., Ser. No. 07/860,633, filed Mar. 30, 1992; (now U.S. Pat. No. 5,410,695, granted Apr. 25, 1995);

"Interdicting I/O And Messaging Operations In A Multi-System Complex" by D. A. Elko, et al., Ser. No. 07/860,489, filed Mar. 30, 1992; (now U.S. Pat. No. 5,394,554, granted Feb. 28, 1995);

"Method and Apparatus for Coupling Data Processing Systems" by D. A. Elko, et al., Ser. No. 07/860,803, filed Mar. 30, 1992. (now U.S. Pat. No. 5,317,739, granted May 31, 1994);

The following related applications are unpublished:

"Quiesce and Unquiesce Function for Intersystem Channels", by Neil G. Bartow, et al., Ser. No. 08/071,154, filed Jun. 1, 1993; (now U.S. Pat. No. 5,481,738, granted Jan. 2, 1996);

"Configurable, Recoverable Parallel Bus", by Neil G. Bartow et al, Ser. No. 08/071,146, filed Jun. 1, 1993; (now U.S. Pat. No. 5,509,122, granted Apr. 16, 1996);

"Frame Group Transmission and Reception for Parallel/Serial Busses", by Neil G. Bartow, et al, Ser. No. 08/071,115, filed Jun. 1, 1993; (now U.S. Pat. No. 5,455,831, granted Oct. 3, 1995);

"Concurrent Maintenance of Degraded Parallel/Serial Busses", by Kenneth J. Fredericks et al, Ser. No. 08/070,587, filed Jun. 1, 1993; (now U.S. Pat. No. 5,418,939, granted May 23, 1995);

"Null Words for Pacing Serial Links to Driver and Receiver Speeds", by Danniel F. Casper et al, Ser. No. 08/071,150, filed Jun. 1, 1993.

"Error Detection and Recovery in Parallel/Serial Busses", by T. A. Gregg, et al, Ser. No. 08/070,589, filed Jun. 1, 1993. (now U.S. Pat. No. 5,455,830, granted Oct. 3, 1995);

"Dumping Service Facility for Multisystem Environments", by D. A. Elko, et al, Ser. No. 08/073,909 filed Jun. 8, 1993.

The following applications are filed concurrently herewith:

"Mechanism for Receiving Messages at a Coupling Facilty", by D. A. Elko, et al, Ser. No. 08/147,697, filed Nov. 4, 1993 (continued as U.S. Ser. No. 08/474,574, Jun. 7, 1995);

"Improved Skew Measurement for Receiving Frame-Groups", by T. A. Gregg, et al, Ser. No. 08/147,701, filed Nov. 4, 1993; (now U.S. Pat. No. 5,455,830, granted Oct. 3, 1995);

"Frame-Group Reception and Processing", by T. A. Gregg, et al, Ser. No. 08/147,702, filed Nov. 4, 1993; (continued as U.S. Ser. No. 08/477,927, on Jun. 7, 1995); and "A Message-Dispatching Mechanism for Messages Received at a Coupling Facility", by D. A. Elko, et al, Ser. No. 08/147,703, filed Nov. 4, 1993; (continued as U.S. Ser. No. 08/477,927, on Jun. 7, 1995).

These co-pending applications and the present application are owned by one and the same assignee, International Business Machines Corporation of Armonk, N.Y.

The descriptions set forth in these co-pending applications are hereby incorporated into the present application by this reference.

BACKGROUND OF THE INVENTION

Fiber optics enable the transmission of long strings of data in a serial fashion from a driver to a receiver at long distances (kilometers) at very high data rates (billions of bits per second). This is in contrast to traditional electrical wires which allow data to be transmitted for only short distances at these data rates (10's of meters).

High performance computers require system buses between elements of a computing system to have even higher bandwidths (100's of millions of bytes per second). The use of a single fiber optic cable running at its maximum bandwidth can be insufficient to serve as a system bus between elements of a computing system.

In the prior art, a classical solution to the problem of inadequate bandwidth on a single carrier is to transmit the bits of each data word, in parallel, one over each of a plurality of carriers (a parallel bus). Another solution, known as striping, entails sending a plurality of serial data words, in parallel, one over each of a plurality of carriers. These solutions, however, share a common problem in that skew can develop between the parallel bits or words as they are sent over the bus.

In addition to high bandwidth, high performance computers also require communication with low latency. In other words, the total time it takes to transmit a message, process the message, and return the response must be kept to a minimum. In prior art, information is transmitted in frames, and all of the information required to transmit a frame is fetched from main processor storage before frame transmission is started, thereby adding latency. Also, all subsequent frames must wait until the present frame is completed; therefore, any higher priority messages cannot be transmitted until the link is idle. A similar situation exists when receiving frames; the entire frame must be received before it is sent to the main processor storage.

The skew introduced by multiple conductors further complicates the interruption of transmission of one message to send a higher priority message. All of the conductors have to be stopped and started in a manner that allows the receiver to keep track of which frames belong to which messages.

Thus what is needed is an improved method for transmitting data words over a plurality of carriers such as multiple fiber optic filaments in a way that allows the lowest possible latency by starling frames before all of the information is fetched from main processor storage, and further by allowing the interleaving of these frames.

SUMMARY OF THE INVENTION

The present invention comprises a system and method for asynchronously transmitting data blocks, in parallel, across multiple carriers in a serial manner. Frame groups are provided as a mechanism to transmit associated data serially on each fiber and tie the data being transmitted together. Frame groups normally contain the entire contents of a request, response, or data area. Sometimes it is desirable to asynchronously end a frame group before the entire area has been transmitted so that a higher priority frame group can be transmitted. One of the properties of all frame groups is that all frames in the frame group contain the same number of words. This enables the frame groups to be transmitted and received by relatively simple hardware since all of the receivers and transmitters are sending and receiving data for the same buffer area at the same time. It is also desirable to end a frame group when the data stream from main processor storage has been temporarily interrupted by other processes in the system.

According to an embodiment of the present invention, the multiple transmitters must be controlled so that all frames of the frame group are started as soon as the data flow from main processor storage starts. The multiple transmitters must also be controlled so that all frames of the frame group are ended on the same word boundary even though each transmitter may be sending words of differing word positions at the same time. Once a frame group has been ended, another higher priority frame group can be transmitted. The frame group that was ended can then be restarted with the appropriate modifications to the link-control-word.

The present invention is also capable of prematurely ending frames when data is temporarily not available to send the entire request, response, or data area. Advantageously, the transmitter can stop sending null words that cause the contents of the frame to be susceptible to errors on the link.

BRIEF DESCRIPTION OF THE DRAWINGS

The present invention will be better understood by reference to the drawings in which.

DETAILED DESCRIPTION OF THE PREFERRED EMBODIMENTS

Figure 1:
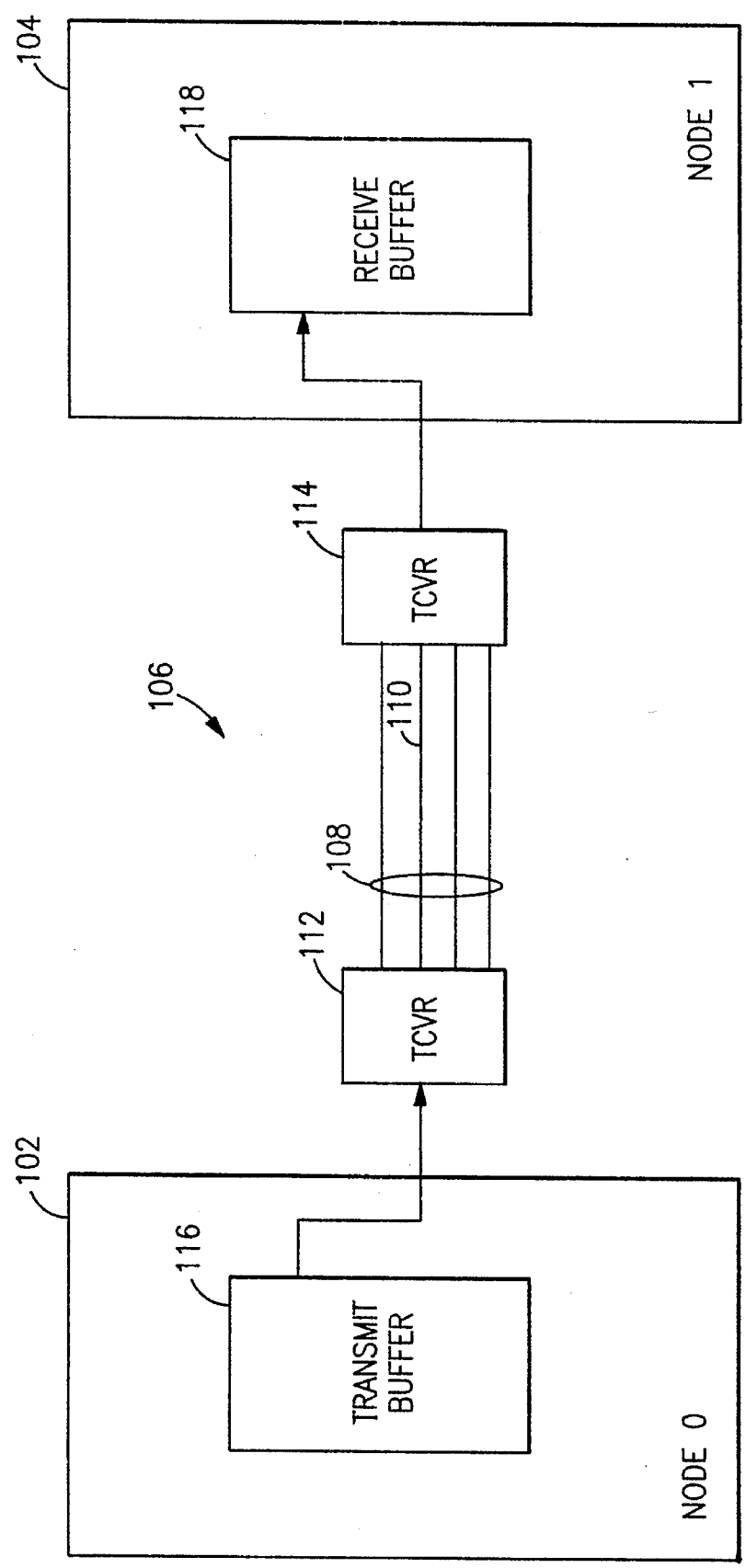
FIG. 1 is a block diagram of a physical link between two computing elements.

Turning first to FIG. 1, a physical link between two computing elements 102, 104 is illustrated. These elements could be, for example, two computers or a computer and a shared memory device. In any event, the computing elements 102, 104 are connected by way of an intersystem channel link 106 comprising a fiber optic bus 108. The fiber optic bus 108 is formed of multiple fiber pairs 110. Each fiber pair consists of two optical fibers, one for transmitting information and one for receiving information. While any number of fiber pairs can be used, exemplary values for intersystem channels would be a range of 1 to 64 fiber pairs in powers of two. The fiber pairs 110 of the fiber optic bus 108 are coupled to the computing elements 102, 104 by way of transceivers 112, 114 located at opposite ends bus. Each of the transceivers 112, 114 includes a transmitter unit and a receiver unit, both of which will be described in more detail later.

All of the data traffic over the fiber optic bus 108 supports message passing between the computing elements 102, 104. A typical message is a request sent from computing element 102 to computing element 104. Data may be associated with the request and is either sent from computing element 102 to computing element 104 (a write operation) or from computing element 104 to computing element 102 (a read operation). After the data is transferred, a response is sent from computing element 104 to computing element 102. The messages, consisting of requests, data, and responses are stored in buffers located in both computing elements. To transfer a request, data, or response, a transmit buffer 116 is required in the transmitting computer element 102, and a receive buffer 118 is required in the receiving computer element 104. In practice, transmit buffers and receive buffers are required in both computing elements in order to complete a message passing operation; this is described later. It should be understood that the transmitting buffer 116 may be located anywhere in the transmitting computer element 102, including the main processor storage. It should be further understood that the receive buffers must at all times be immediately accessible by the transceiver 114. Therefore, the receive buffer 118 is usually implemented as an array dedicated to the channel, and it is not in main processor storage where access is shared among many different elements within the computer.

Figure 2:
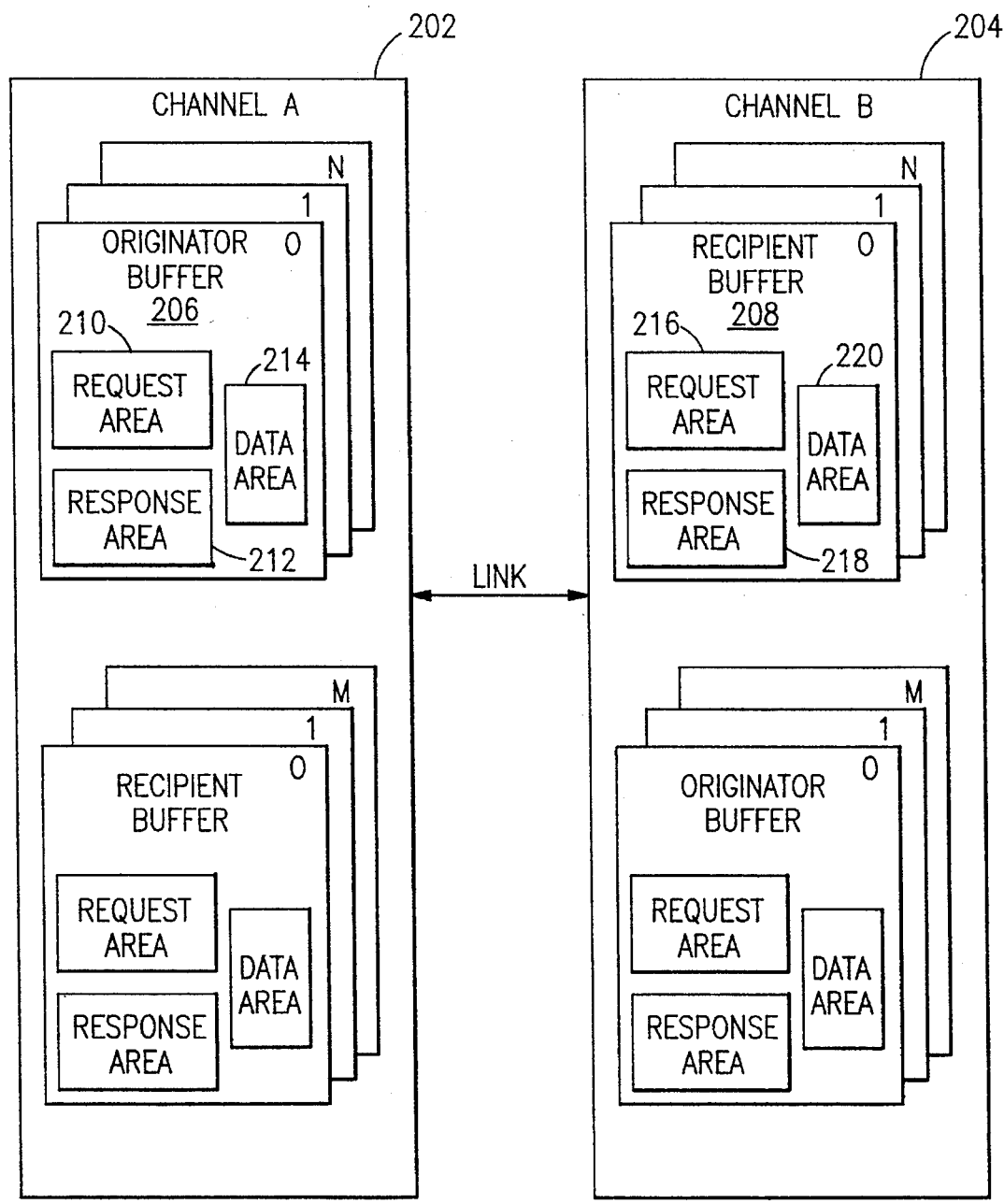
FIG. 2 illustrates a multimessage channel buffer structure.

To process a complete message with data requires buffers in both computing elements 102, 104. The computing element that initiates the message is the originator, and the computing element that processes the message is the recipient. FIG. 2 shows multiple buffers on both sides of a link. For example, to pass a message with data from Channel A 202 to Channel B 204 requires the Channel A originator buffers shown in block 206 and the Channel B recipient buffers shown in block 208. Each group of buffers in blocks 206, 208 are called "buffer sets." When a message is sent, the originator buffer request area 210 is loaded with the request, and the request is sent over the link to the recipient buffer request area 216. If data is to be transferred, it is either sent from originator buffer data area 214 to recipient buffer data area 220 for a write operation, or it is sent from recipient buffer data area 220 to originator buffer data area 214 for a read operation. After data transfer, if any, the response is loaded into the recipient buffer response area 218 and sent across the link to the originator buffer response area 212.

The information transferred from one side of the link to the other is contained in frames or frame groups. This information is always targeted to a particular buffer area, and the targeting information is contained in the link-control word of the frame. This targeting information allows the frames to be multiplexed over the link in any order. As an example, returning to FIG. 2, Channel A could send a request for buffer set 1 followed by write data for buffer set 0, followed by a response for buffer set 0, etc. It should be understood that a computing element can dynamically set up various numbers of originator and/or recipient buffers depending on the number and type of links to be established.

Figure 3:
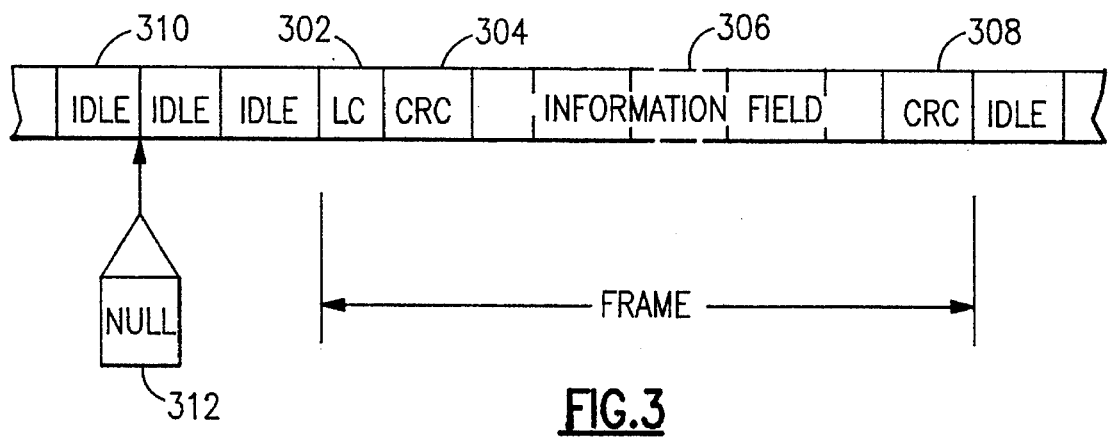
FIG. 3 is an illustration of the format of an exemplary frame.

The format of an exemplary frame is illustrated in FIG. 3. When no frames are being transmitted, the idle words 310 are continuously sent on the link. When frames are transmitted, they start with a data word which is the link-control word (LC) 320. Various fields in the link-control word 302 identify the frame format and type, designate a buffer set area, and control the state of the transceiver and link, and these fields are described in more detail later. Null words 312 can be inserted anywhere in the stream of idle or data words. These words do not affect the contents of the frames and are used to regulate the flow of information on the link. (See the above referenced:

"Null Words for Pacing Serial Links to Driver and Receiver Speeds", by Danniel F. Casper et al, Ser. No. 08/071,150, filed Jun. 1, 1993.)

A link-control-CRC (cyclical redundancy check) word 304 follows the link-control word. The link-control CRC word 304 is conventionally generated from the values in the link-control word. The link-control CRC word is checked at the receiver to test the validity of the link-control word in the incoming frame.

There are two types of frames, control frames and information frames. Control frames do not have an information field. They consist only of a link-control word and a link-control CRC word. An information frame has a link-control word 302 a link-control CRC word 304 and an information field 306. Information fields contain, for example, from one to 1,024 words. The information field contains the information sent from a buffer set area at one end of the link to a buffer set area at the other end.

An information field is followed by an information-field CRC word 308. The information-field CRC word is conventionally generated from the values in the information field. The information field CRC word is checked at the receiver to test the validity of the information field in the incoming frame.

Figure 4:
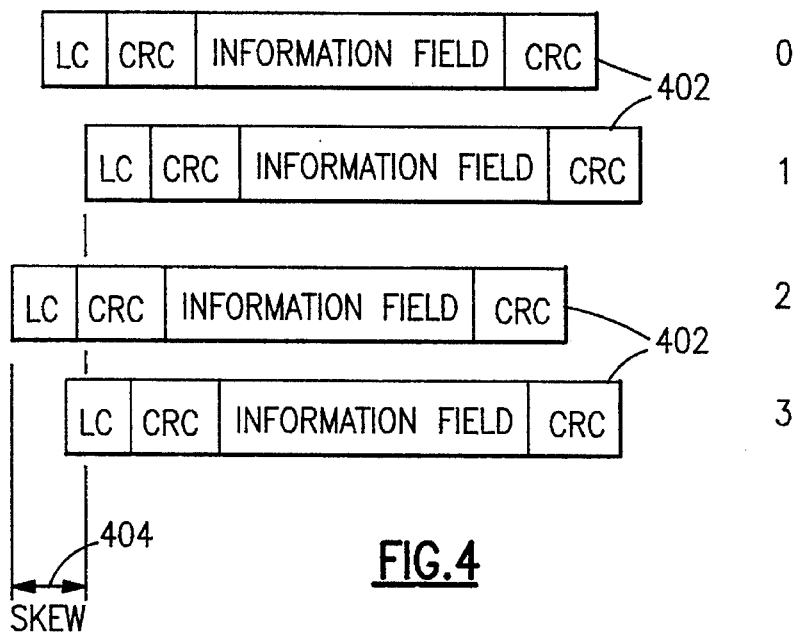
FIG. 4 is an illustration of the format of an exemplary frame group.

Related information can be placed in several frames, one on each transceiver of the operational link. These frames (referred to as a "frame group") are transmitted concurrently. There must be as many frames in the frame group as there are transceivers in the operational link. FIG. 4 shows an exemplary frame group 402 transmitted on four transceivers. The use of the frame group enables the data to be sent at a bandwidth that is multiples of the single fiber optic bandwidth since multiple frames (one per fiber) are transmitted simultaneously across the link. The time difference between the transmission or reception of the beginning of the first frame to the beginning of the last frame of the group is called skew 404.

Although not provided with sequence numbers, each frame group is largely interlocked with those of subsequent and previous frame groups. The interlocking can be accomplished by the protocol on the link. For example, each message for a particular buffer set starts with a request, followed by data, followed by a response. Each of these types of transmissions has a unique link-control word since each transmission is targeted to differing buffer set areas.

Figure 5:
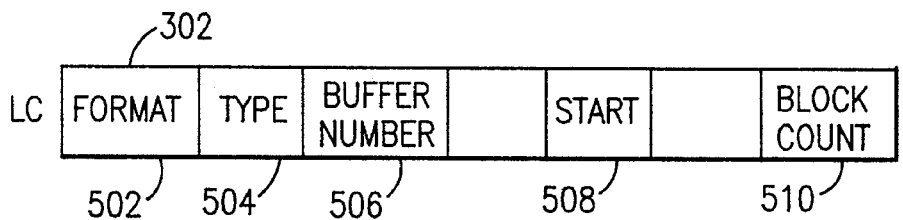
FIG. 5 is an illustration of the contents of the Link Control word.

FIG. 5 shows details of the link-control word 302. Information transferred to a particular buffer may be contained in more than one frame or frame group. The first frame for a buffer area always has the Start 508 bit on and this bit also indicates the validity of the Block Count 510. This count indicates the total number of 256 byte blocks that will be transferred to the buffer, and this count does not indicate the length of the presently transmitted frame. The transmitter can end the frame with a CRC 308 word on any 256 byte boundary of the information 306 field. When the transmitter resumes the transfer to the buffer, it starts the new frame with the Start 508 bit in the link-control word reset to zero. The zero value of the start bit indicates that this frame is a continuation of the previous frame targeted to the same buffer. The receiver knows that all of the information has been received when the total number of 256 byte blocks transmitted in all of the frame groups have been received and satisfy the Block Count 510 transmitted in the link-control word of the first frame group. A buffer area can be transmitted by any number of frame groups from one to the total number of 256 byte blocks. For example, a 1024 byte buffer area can be transmitted in any number of frame groups from one to four. In fact, there are eight different combinations of frame group lengths that can be used to transmit a 1024 byte buffer area. These are a single four block frame group, four single block frame groups, two single block frame groups followed by a two block frame group, a two block frame groups followed by two single block frame groups, a single block frame group followed by a two block frame group followed by a single block frame group, a two block frame group followed by another two block frame group, a single block frame group followed by a three block frame group, and a three block frame group followed by a single block frame group. Longer buffer areas have even more possibilities. The only rule is that the 256 byte blocks are sent in ascending order.

The ability to split the transfer of information to a buffer set area has two distinct advantages. First, the channel can start transmitting the frame group before the entire buffer set area is fetched from main store. At any time during the transmission, data required to send the information field may become unavailable for a while. In this case it is desirable for the transmitter to end the frame and restart it when the data flow from main processor storage resumes. Second, frame groups can be interleaved in any combination. This interleaving capability allows the best possible utilization of the link since whatever data can be sent that is available and higher priority frame groups, such as requests or responses, can interrupt longer running data area frame groups.

Figure 6:
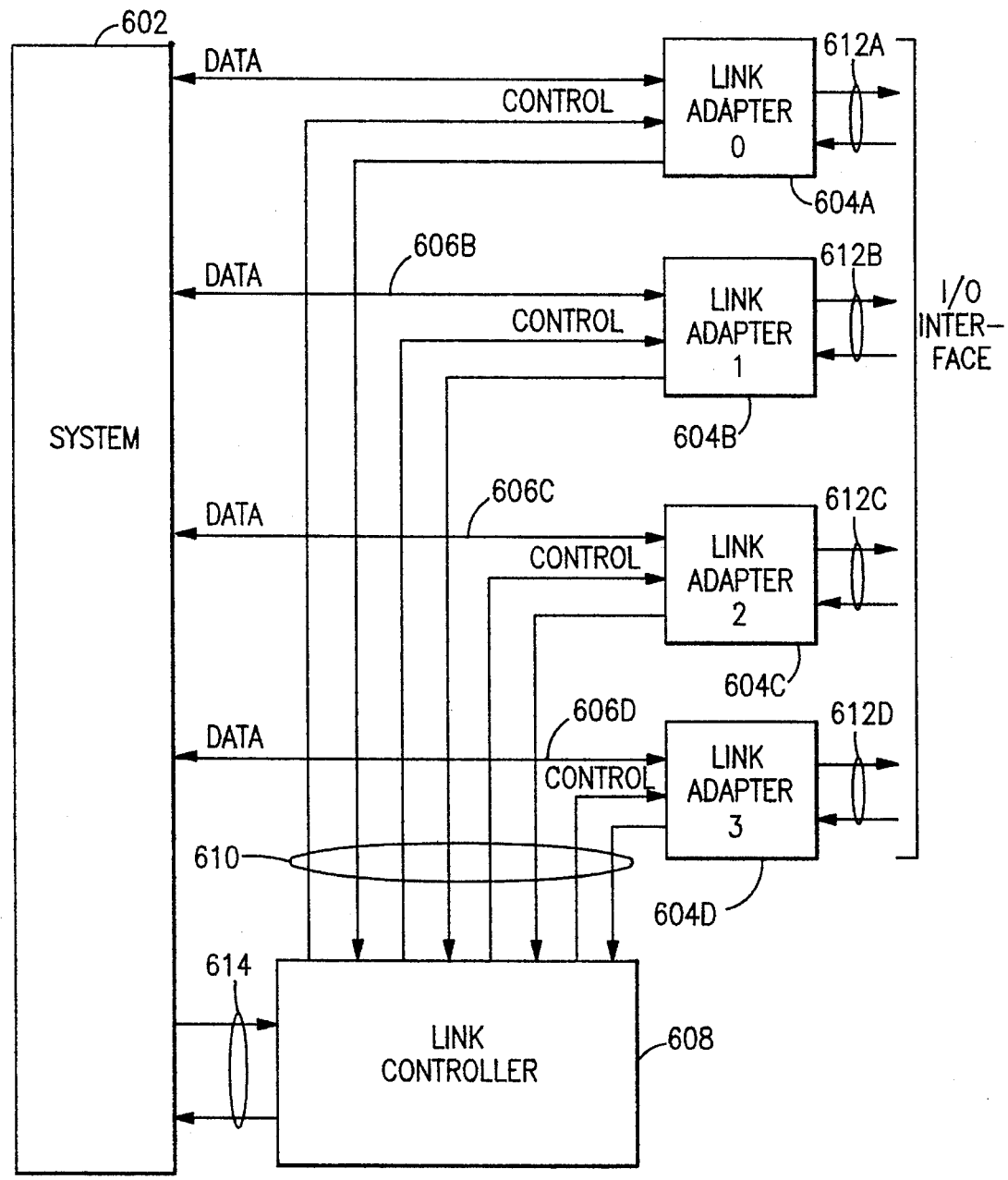
FIG. 6 is a block diagram of one end of a multiconductor link.

The multiconductor channel shown in FIG. 6 communicates over a four fiber pair link. Each of the four fiber pairs 612(A,B,C,D) is controlled by a Link Adapter 604(A,B,C, D), and each of these Link Adapters operates in a largely independent fashion. For example, each of the Link Adapters has its own data buffering and its own interface oscillator. The primary data path to the System 602 is over the four bidirectional Data 606(A,B,C,D) buses. The flow of information is managed by the Link Controller 608. The Link Controller communicates with the Link Adapters 604(A,B,C,D) over multiple Control 610 lines, and it communicates with the System over another group of control lines 614. The Link Controller contains a microprocessor and logic required to synchronize the operation of the Link Adapters 604(A,B,C,D).

Figure 7:
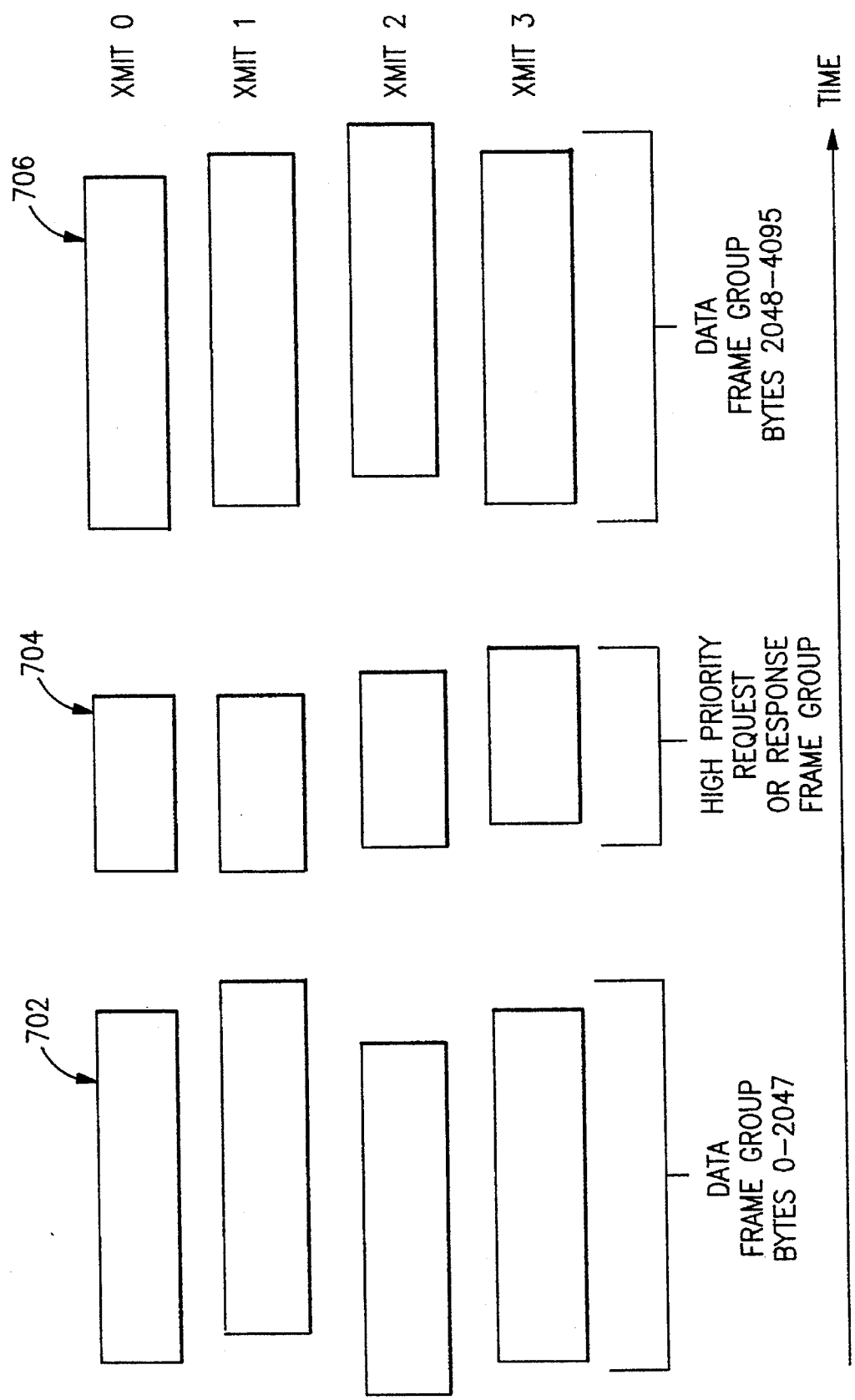
FIG. 7 is a time line of one frame being suspended to send another higher priority frame.

Through the action of the Start 508 bit and the Block Count 510 described earlier, frame transmission of a particular frame can be interrupted to send a frame of higher priority. This situation usually occurs when a short (e.g. 32 byte) high priority request or response frame interrupts transmission of a long (e.g. 4096 byte) data frame. Any frame may be interrupted on any or all of the 256 byte boundaries, and when the remainder of the frame is sent, the start bit in the link-control word is set to zero. FIG. 7 shows a data frame group 702 interrupted by a high priority request or response frame group 704 for a different and unrelated message. The first 2048 bytes of frame group 702 are sent, and ended with the CRC word. The high priority request or response 704 is then sent followed by the data frame group 706 containing the last 2048 bytes of the interrupted data frame.

Figure 8:
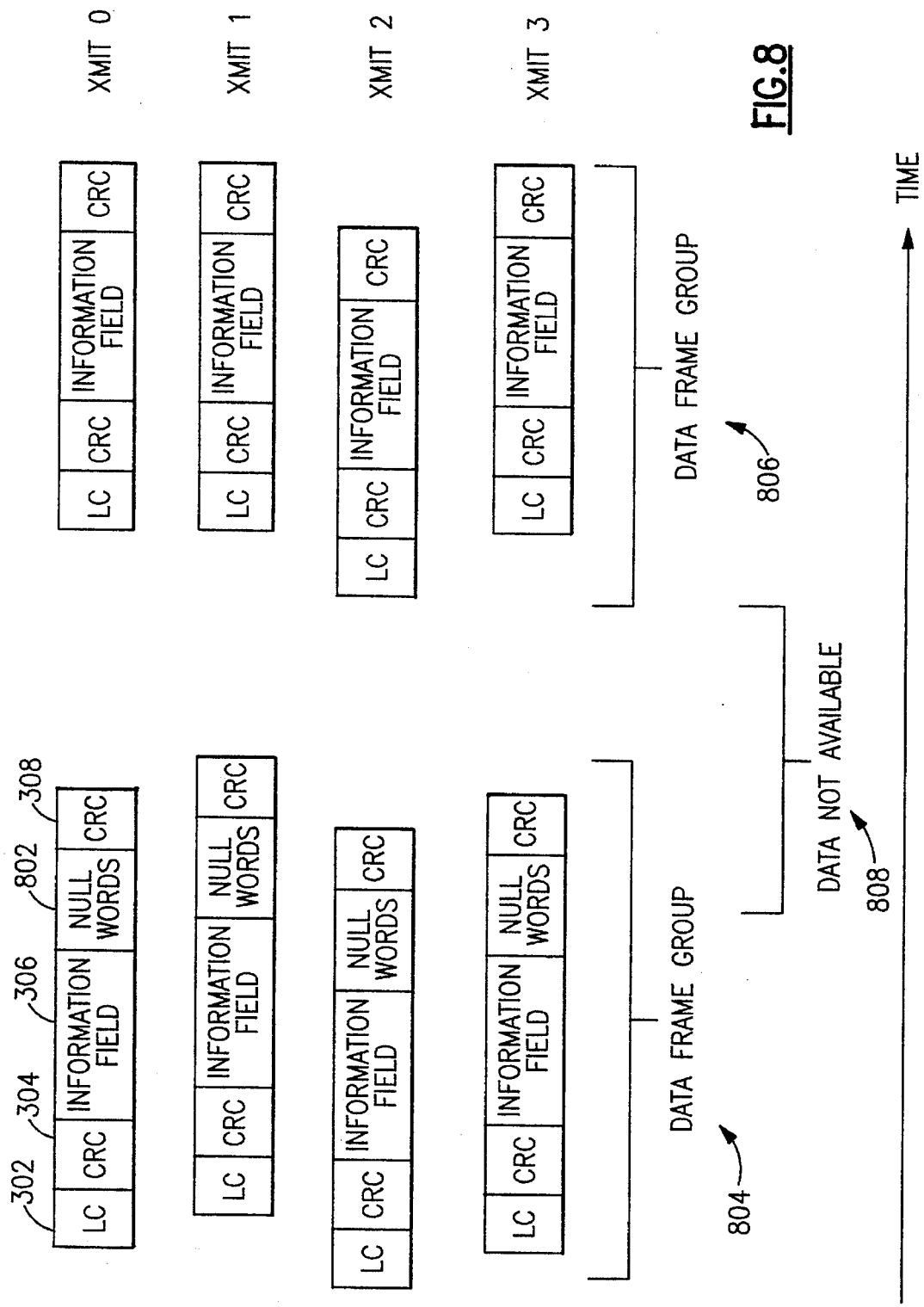
FIG. 8 is a time line of one frame being suspended due to inactivity on the link.

Another situation when a frame is interrupted occurs when there is a pause in the data stream from the System 602 and is illustrated in FIG. 8. When the Link Adapters 604(A, B,C,D) run out of information before the frame has completed, they insert null words 802 until more data is received. While this situation exists, the contents of the frame is exposed to errors caused by noise on the link since the CRC word has not yet been transmitted. A timer is used to detect this situation so that the null words are eventually stopped and the frame is ended with the CRC word. Another case that causes null words to be transmitted is when a buffer area is moved from the Link Adapters to the System. Because the Data Buses 606(A,B,C,D) are bidirectional, the outbound flow of information is temporarily stopped while buffer areas are being transferred to the System. In both cases, when the data flow from the System to the Link Adapters is resumed, a new frame 806 is started to finish the transferring the buffer area.

All frames belonging to the same frame group must have the same number of words. This requirement was chosen to simplify the design of the receiver and to improve the error checking capabilities of the link. Also this requirement in many ways simplifies the design of the transmitter; however, to improve the fault tolerance capabilities of the link, the transmitters operate in a largely independent fashion, each with its own transmit oscillator, buffers, and control logic. This independence of the transmit logic of the Link Adapters makes it difficult to end frame groups on the same block boundaries, and the mechanisms used to ensure the proper ending of all the frames of a frame group is described below.

Figure 9:
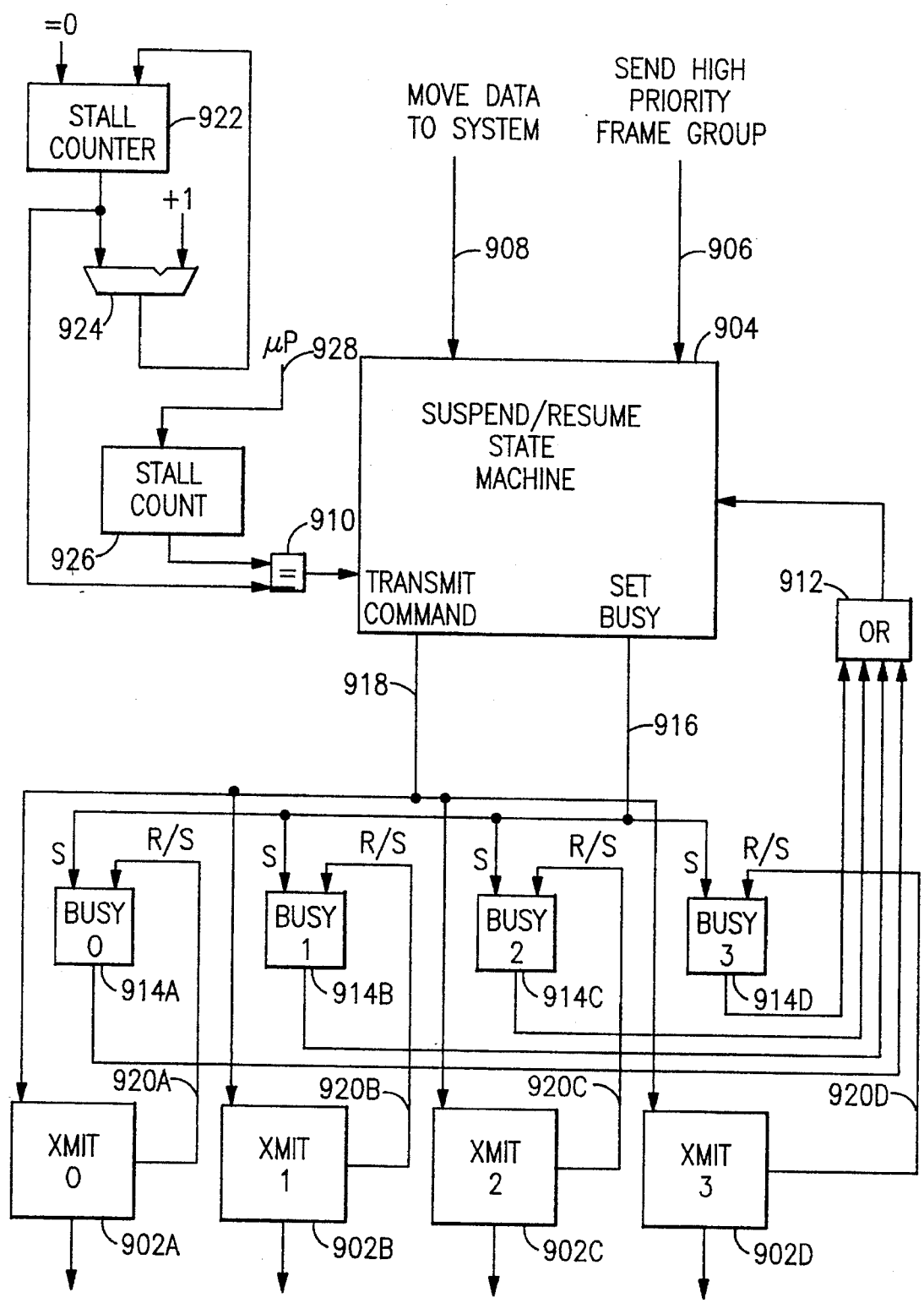
FIG. 9 is a logic diagram of an exemplary transmitter showing details of the Link Controller function.

FIG. 9 shows portions of the Link Controller that manage XMIT0 902A, XMIT1 902B, XMIT2 902C, and XMIT3 902D which are the transmitting portions of the Link Adapters 604(A,B,C,D). The Suspend/Resume State Machine 904 controls ending currently transmitted frame groups, instructs the XMIT 902(A,B,C,D) functions to send high priority frame groups, and resumes transmission for the prematurely ended buffer area. The Suspend/Resume State Machine 904 receives instructions to send high priority frames from the microprocessor over control line 906, instructions from the System to move data from the Link Adapters to the System over control line 908, and an outbound stall condition from compare circuit 910. Also, the output of OR circuit 912 is called Outbound Busy 930 and is sent to the Suspend/Resume State Machine 904. The inputs to OR circuit 912 are from the BUSY0 914A, BUSY1 914B, BUSY2 914C, and BUSY3 914D latches. As a result, the output of OR circuit 912 indicates that all four of the XMIT functions are not busy; this will be described further later. The Suspend/ Resume State Machine 904 can set the BUSY 914(A,B,C,D) latches over control line 916, and broadcasts transmit commands to the XMIT 902(A,B,C,D) functions over control lines 918. The BUSY 914(A,B,C,D) latches are also controlled by the XMIT 902(A,B,C,D) functions over lines 920(A,B,C,D). An active state on lines 920(A,B,C,D) indicates that the corresponding XMIT function is busy sending a frame, and causes the corresponding BUSY 914(A,B,C,D) latches to be set. The BUSY latches are reset by the transition of lines 920(A,B,C,D) from the active state to the inactive state. Thus, the BUSY latches are only reset when the corresponding XMIT functions go from the busy to the not busy state. Finally, the Link Controller has a counting mechanism for determining when an outbound frame transfer has stalled. Stall Counter 922, Incrementer 924, and Stall Value 926 count the number of cycles that the XMIT functions are requesting data from the System and the data has not yet been delivered. Remember that as soon as the XMIT 902(A,B,C,D) functions empty their transmit buffers, they start sending null words on the outbound link. The Stall Value can be set by the microprocessor over lines 928. When the value in Stall Counter 922 equals the value in the Stall Value 926 register, compare circuit 910 detects this condition and indicates the condition to the Suspend/Resume State Machine.

Figure 10A:
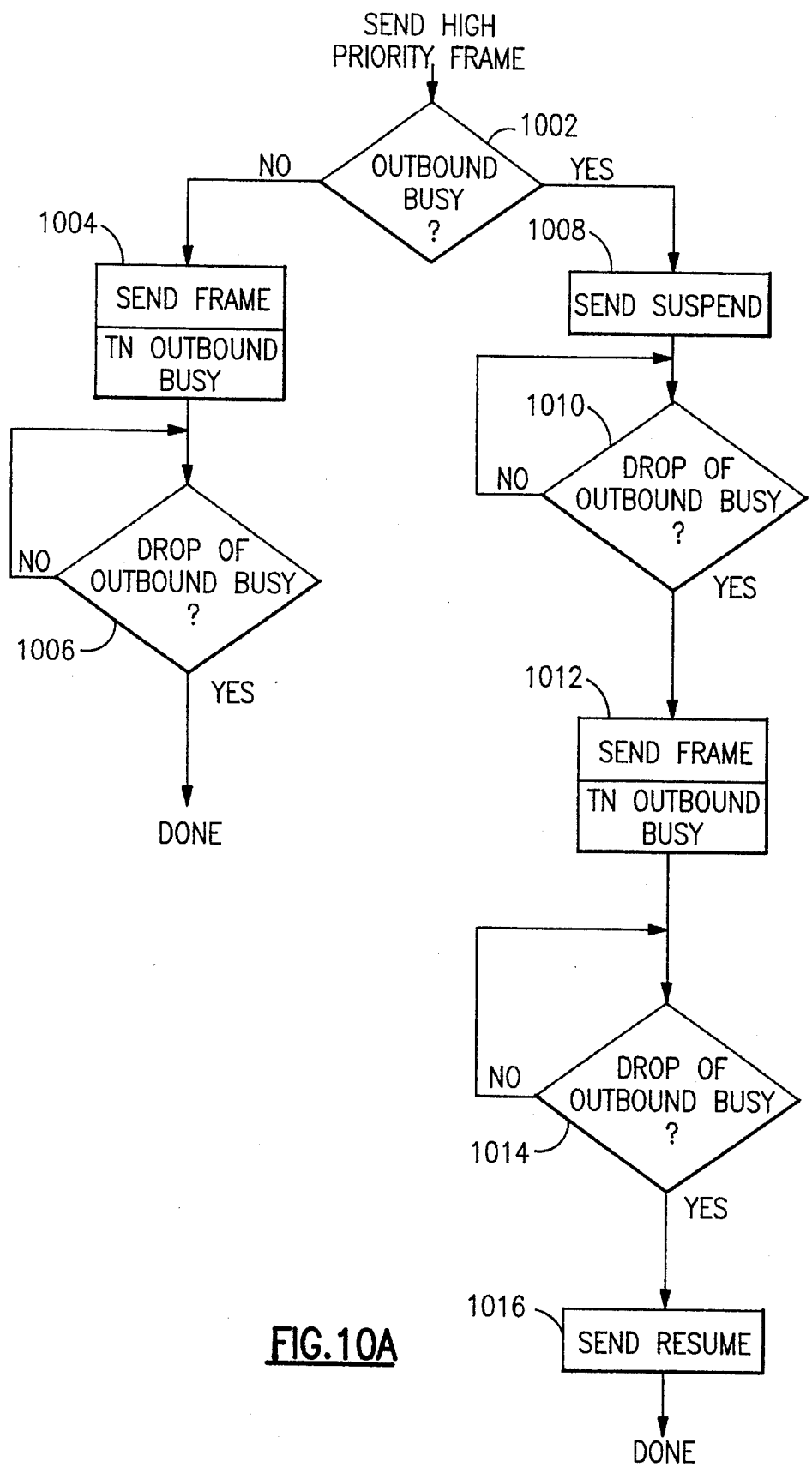
FIG. 10 is a flowchart of the suspend/resume state machine in the Link Controller.

The operation of the Suspend/Resume State Machine is described by the flowcharts in FIG. 10A, 10B, and 10C. In FIG. 10A, a request to send a high priority frame is received from the microprocessor. If the Outbound Busy 930 condition as detected in decision block 1002 is off, all of the XMIT 902(A,B,C,D) functions are idle, and the command to send the high priority frame is sent to the XMIT functions is sent in step 1004. The BUSY 914(A,B,C,D) latches are also set in step 1004. In decision block 1006, the Suspend/Resume State Machine waits for all of the XMIT functions to finish before it accepts another request. If the Outbound Busy condition as detected in decision block 1002 is on, another lower priority frame is being sent by the XMIT functions. In this case, the Suspend/Resume State Machine sends a Suspend Command in step 1008 which causes all of the XMIT functions to end the frames they are presently sending using an algorithm described later. The Suspend/Resume State Machine next waits for the XMIT functions to finish sending the lower priority frames in decision block 1010 and then commands the XMIT functions to send the high priority frame in step 1012. The BUSY latches are also set at the same time. The Suspend/Resume State Machine again waits for the XMIT functions to complete sending the frame in decision block 1014. Once all of the XMIT functions have completed sending the frame, a Resume command is sent to all of the XMIT functions in step 1016 allowing the previously interrupted lower priority frame to be restarted.

The outbound stall condition is shown in FIG. 10B. Since this condition can be detected only when the XMIT functions are busy sending a frame and the data flow from the system has been slowed down for a relatively long time, the Suspend/Resume State Machine immediately sends the Suspend command to the XMIT functions in step 1040. When the XMIT functions acknowledge that they have ended the frame by indicating that they are no longer busy, the condition is detected by decision block 1042. The Resume command is immediately sent to the XMIT functions in step 1044, and the XMIT functions will restart transmission as soon as data is available from the System.

The third and last condition handled by the Suspend/Resume State Machine occurs when information is transferred from the Link Adapters to the System. Since the primary data path is a bidirectional bus and can only support data movement in one direction at a time, the transmission of outbound frame groups is interrupted while the information from received frames is being transferred to the system. To prevent long strings of null words from being transferred, the Link Controller sends a a Suspend command to the XMIT functions before data is transferred to the System. In decision block 1070 the Outbound Busy condition is tested. If it is off, the data transfer to the System is stated. If there is an Outbound Busy condition, a Suspend command is sent in step 1072, and the Suspend/Resume State Machine waits for the Out-bound Busy condition to clear in decision block 1074 before sending the Resume command to the XMIT functions in step 1076.

Figure 11:
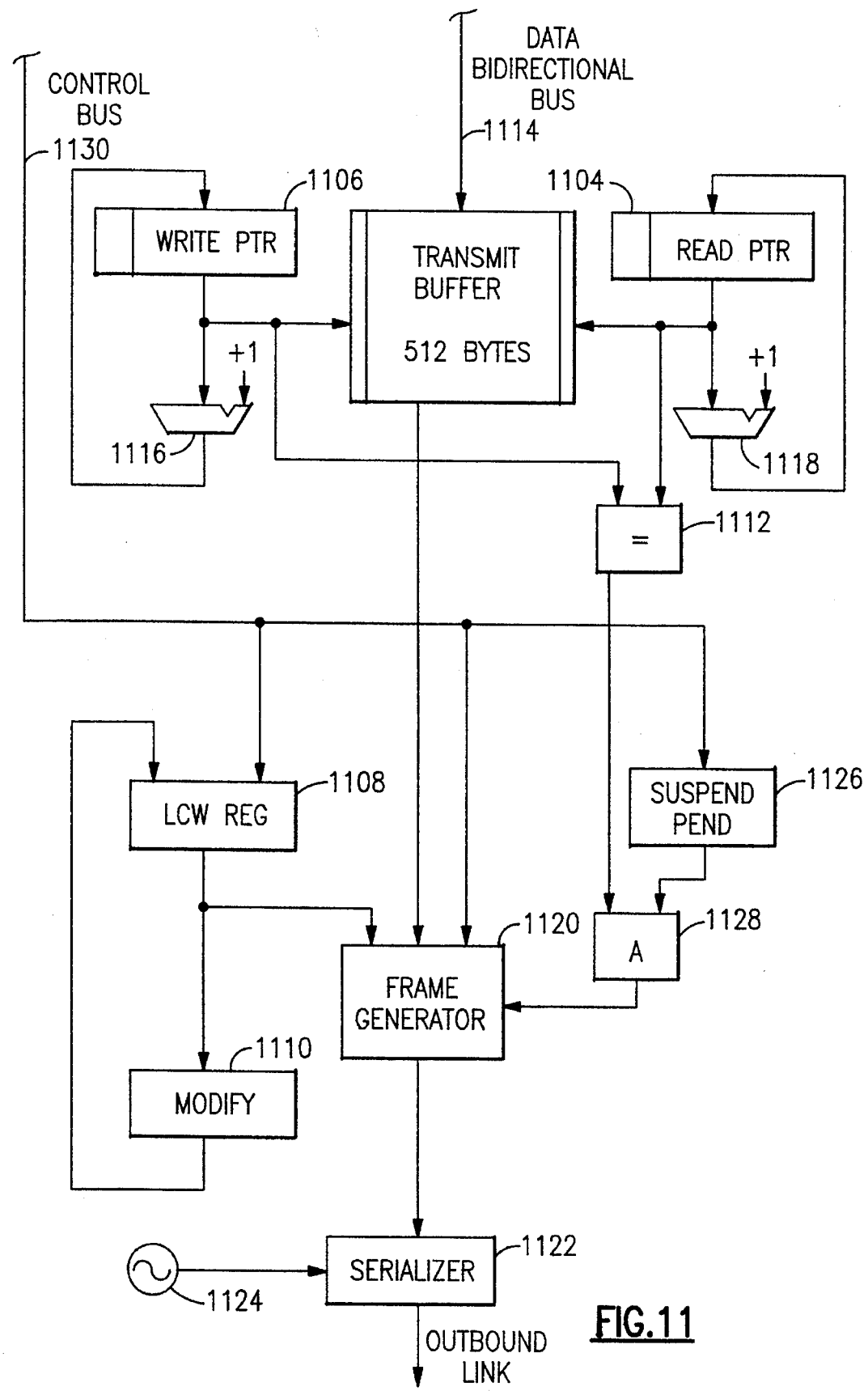
FIG. 11 is a logic diagram of an exemplary transmitter showing the transmit details of one of the four Link Adapters.

FIG. 11 is a block diagram of one of the XMIT 902(A,B,C,D) functions. The central element of a XMIT function is the Transmit Buffer 1102. This buffer is not one of the buffer set buffers described earlier, and it is used to smooth the data flow from the System that occurs in bursts to the steady rate on the link. As data is received from the System over data bus 1114, it is stored into the Transmit Buffer 1102 at the address specified in the Write Pointer 1106. This pointer is incremented by block 1116 after each word is stored. Concurrently with the receipt of data from the System, the contents of the Transmit Buffer 1102 can be read under control of the Read Pointer 1104. The data accessed from the Transmit Buffer 1102 is then sent to the Frame Generator 1120. The Frame Generator 1120 assembles the link-control word and information field into a frame; the CRC is also calculated and added. From the Frame Generator, the frame goes to the Serializer 1222 which is clocked by its own oscillator 1124. The Frame Generator 1120 also contains a number of registers and small buffers used to store the contents of high priority request and response frames.

The XMIT functions cannot simply end frame transmission as soon as they receive a Suspend command from the Link Controller over bus 1130. The Write Pointer 1106 is used to determine when the frame should be ended after after receiving a Suspend command. As discussed earlier, all frames of a frame group must be the same length and, therefore, must also be ended on the same block boundary. However, since each of the XMIT functions has its own independent transmit oscillator 1124, the exact time that each XMIT function finishes transmitting a block varies. Thus, if the XMIT functions simply end frame transmission at the end of the next block after the Suspend command is received, some of the XMIT functions may end their frames on one block boundary while other XMIT functions may end their frames on another block boundary. This is not a desirable situation as explained earlier. Referring to FIG. 11, the values of the Read Pointers 1104 for the Transmit Buffers 1102 of the multiple XMIT functions may not all have the same values at the same time, and the values in these Read Pointers 1104 cannot be used to determine when a frame should be ended due to a Suspend command. On the other hand, the values in the Write Pointers 1106 always have the same value because sending data to the XMIT function occurs to all of the XMIT functions at the same time. All XMIT functions receive a word of information on the same cycle; therefore, the values in the Write Pointers 1106 stay in lock step. To guarantee that all of the XMIT functions end the individual frames of the frame group on the same block boundary, the values in the Write Pointers 1106 are used to determine when the frame should be ended.

In practice, the algorithm of examining the Write Pointers 1106 is complicated by the operation of the transmit buffer.

To improve the performance of the link, the XMIT functions start to transmit a block as soon as they know they will receive the entire block from the System. Data is received from the System in groups of bytes called lines. Lines are typically 64, 128, or 256 bytes. The XMIT function is designed with the knowledge that after the first bytes of the line are received from the System, the entire line will received without interruption. In contrast, the data for the next line may be delayed indefinitely. So, once the first bytes of the last line of a 256 byte block are received by the XMIT functions, the XMIT functions can start to transmit that block.

The Suspend command can be received from the Link Controller at any time including in the middle of receiving data from the System. When the Suspend command is received, the XMIT functions first raise the hold line (part of Control lines 610) to the Link Controller which causes the Link Controller to inhibit data transfer from the System on the next line boundary. The Suspend Pending bit 1126 is also set, and the Frame Generator 1120 starts to initiate the ending of the frame. After waiting the appropriate number of cycles for the hold condition to be sent to the System through the Link Controller and the the transfer of a current line of data to be completed, the XMIT functions examine the contents of the Write Pointers 1106 to determine when the current low priority frame will be ended. The algorithm is to end the frame after the last full 256 byte block has been transmitted. This is accomplished by comparing the high order bits of the Write Pointer 1106 to the high order bits of the Read Pointer 1104. This comparison is performed by '=' function 1112. When these high bits are equal, the last full block has been transferred, and the frame is is ended. At this point there may still be some data remaining in buffer 1102, but it is not sent because a full 256 byte block is not yet available for transmission.

An alternate method of determining when to end the low priority frame is to examine the contents of the Write Pointer 1106 when the Suspend command is received from the Link Controller. If at the time of receiving the Suspend command the Write Pointer 1106 is within the last line of a 256 byte block, the XMIT function stores this block number and continues to transmit the number of blocks specified by this stored number.

Another alternate method is to have the XMIT function continue to transmit the frame until it reaches the last complete 256 byte block of data. Normally, at this point, without a Suspend command active, the XMIT function transmits null words until more data is received from the System. In this case, when a Suspend command is active, the XMIT function ends the frame instead of inserting null words.

In all of the above methods, only the contents of the Write Pointer 1106 is used to determine where to end the frame, and as a result, all of the XMIT functions make the same choice. After the frame has been ended, the XMIT function deactivates the outbound busy indication to the Link Controller. The Link Controller may send a high priority frame at this point, request to retrieve data from the Link Adapters, or simply send a Resume command. Eventually, the Link Controller always sends a Resume command since the Link Controller does not know if the XMIT functions have not completed a low priority frame.

When the Resume command is received from the Link Controller, the XMIT function determines if it has to complete a frame. If so, the XMIT function first modifies the link-control word that is stored in the LCW REG 1108 using the Modify logic 1110. This modification turns off the start bit in the link-control word. Next, the XMIT function waits until enough data is received from the System before frame transmission starts. The Link Controller can always immediately send a Resume command after the Outbound Busy condition turns off.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A method for transmitting frame groups which may contain information field(s) from a main processor storage buffer area across a communications link including a plurality of carriers to a receiving buffer area, comprising the steps of:
    beginning transmission of a frame group without waiting to receive any further information field(s) for the frame group from main processor storage;
    providing information in a link-control word portion of a frame specifying a total number of blocks to be transmitted to the receiving buffer;
    specifying in the link-control word that the frame group for which the link-control word is associated is the first of one or the first of multiple frame groups required to transmit the contents of the buffer area.

2. A method for ending a frame group in an environment of multiple independent transceivers operating with independent clocks, comprising the steps of:
    asynchronously broadcasting a command from a source to all transceivers instructing them to suspend, or end, a frame being currently transmitted; and
    receiving at each tranceiver the broadcast command, and if the command is a suspend command, determining on what block boundary within the frame to end the frame transmission; and
    ending the frame at a block boundary
    within the frame even if its transmission is incomplete and not ended
    and returning to the source an indication of frame end.

3. The method of claim 2 wherein all data is transmitted to all receive buffers at the same logical time and the progress of frame transmission is equally determined on all transmitters by examining an amount of data received by the transmit buffers.

4. The method of claim 1
    wherein the amount of data received by a buffer of said transceivers currently transmitting said frame is determined by waiting for the data transmission to end.

5. The method of claim 1
    wherein the amount of data received by a buffer of said transceivers currently transmitting said frame is determined at the instant that a Suspend command is received by the transmit buffers.

6. The method of claim 5
    wherein the amount of data received by a buffer of said transceivers currently transmitting said frame is determined when the transmitters would normally transmit null words.

7. A method for determining that all of the transmitters of a frame group communication link having multiple transceivers and a link controller have finished transmitting a current frame group comprising the steps of:

setting a busy bit for each tranceiver when the command to transmit a frame is sent to the transmitters; and also setting said busy bit for each transceiver when the transmitter indicates that it is busy transmitting a frame; and resetting said busy bit only by transitions from the active state to inactive state when the transmitter indicates that it is no longer busy sending the frame for indicating the ending of frame transmission.

8. A method according to claim 7 wherein after all transceivers have ended frame transmission and all transmitters have indicated that they are no longer busy sending a frame after a Suspend command, allowing a step of sending a higher priority frame group after transmission of the current frame group is initiated whether or not a frame transmission has completed.

9. A method according to claim 8 wherein a transmission of a frame group can prematurely become ended as a result of an initiated Suspend command, as by an interrupt for a higher priority message, whereupon said busy bit for each transceiver has been reset, and wherein thereafter the transmission of said prematurely ended frame group is resumed after an intervening transmission, as a higher priority frame group transmission, has completed.

10. A method of controlling communication among nodes of a computer system having a plurality of communicating nodes, comprising the steps of:

transmitting in transmit mode a sending data frame having a beginning link-control word, and an information field and having some first priority between nodes of the computer system from at least one transmitting communicating node to at least one receiving communicating node;

interrupting the transmission of said transmit mode data frame and suspending its transmission at said first transmitting communicating node whether or not said first priority frame transmission has completed transmission of all of its information field and completed transmission of its frame without causing an error or abortion of the sending data frame at a receiving communicating node, transmitting a priority interrupt message frame while said transmit mode data frame is suspended, and after the priority interrupt message frame is transmitted, resuming the transmission of said transmit mode data frame.

11. A method for suspending a frame group in an environment of multiple independent transceivers operating with independent clocks, comprising the steps of:

asychronously broadcasting a suspend command from a source upon a stall indication to all transceivers instructing them to suspend a frame being currently transmitted; and receiving at each tranceiver the broadcast suspend command and determining on what block boundary within the frame to end the frame transmission; and ending the frame and returning to the source an indication of frame end, wherein, said suspend command is broadcast from said source upon a stall indication, and upon a indication received by the source that transmission of frames has ended, then broadcasting a resume command to all transceivers to instruct them to resume transmission.

12. A method for transmitting frame groups which may contain information field(s) from a main processor storage buffer area across a communications link including a plurality of carriers to a receiving buffer area, comprising the steps of:

beginning transmission of a frame group with a first data frame of said group having a beginning link-control work, and information fields as soon as data flow from main processor storage starts and before waiting to receive any further information field(s) for the frame group has been received from main processor storage;

providing information in a link-control word portion of a frame specifying a total number of blocks to be transmitted to the receiving buffer;

suspending transmission of a frame group from a transmitter whether or not a frame of said transmitting frame group has completed transmission of all of its information field and completed transmission of its frame without causing an error message or abortion of the sending data frame; and resuming transmission of the suspended frame group; wherein upon resumption of transmission of a suspended frame group a link-control word of a first frame of frame group being transmitted as a resuming transmission of the suspended frame group specifies where the information of the frame group being transmitted begins without resending any information previously sent in frame(s) previously transmitted before suspension of the suspended frame group.

13. A method according to claim 12 wherein is included asynchronously broadcasting a command from a source to all transceivers instructing them to suspend, or end, a frame being currently transmitted; and receiving at each tranceiver the broadcast command, and if the command is a suspend command, determining on what block boundary within the frame to end the frame transmission; and ending the frame and returning to the source an indication of frame end, whereby upon resume the source can supply for resumption of transmission a first frame upon resume transmission that specifies where a resumed transmission begins whereby the information of the frame group being transmitted upon resumption begins without resending any information previously sent in frame(s) previously transmitted before suspension of the suspended frame group.

14. A method for transmitting frame groups which may contain information field(s) from a main processor storage buffer area across a communications link including a plurality of carriers to a receiving buffer area from transmit buffer associated with each carrier, comprising the steps of:

beginning transmission of a frame group from said plurality of carriers without waiting to receive any further information field(s) for the frame group from main processor storage;

providing information in a link-control word portion of a frame specifying a total number of blocks to be transmitted to the receiving buffer;

specifying in the link-control word that the frame group for which the link-control word is associated is the first of one or the first of multiple frame groups required to transmit the contents of the buffer area, whereby all frames of the frame group are started as soon as the data flow from said main processor starts wherein for ending a transmission of a frame group, the method includes:

asynchronously broadcasting a command from a source to all transceivers instructing them to suspend, or end, a frame being currently transmitted; and receiving at each tranceiver the broadcast command, and if the command is a suspend command, determining on what block boundary within the frame to end the frame transmission; and ending the frame and returning to the source an indication of frame end whereby all frames of the frame group are ended on the same word boundry even though a carrier may be transmiting words of differing word positions at the same time as words of the frame group are being transmitted over another carrier.

15. The method of claim 14 wherein all data is transmitted to all receive buffers at the same time even though a carrier may be transmiting words of differing word positions at the same time as words of the frame group are being transmitted over another carrier and the progress of frame transmission is equally determined on all transmitters by examining an amount of data received by the transmit buffers.

16. A method according to claim 15 wherein for determining that all of the transmitters of a frame group communication link having multiple transceivers and a link controller have finished transmitting a current frame group comprising the steps of:

setting a busy bit for each tranceiver when the command to transmit a frame is sent to the transmitters; and also setting said busy bit for each transceiver when the transmitter indicates that it is busy transmitting a frame; and resetting said busy bit only by transitions from the active state to inactive state when the transmitter indicates that it is no longer busy sending the frame for indicating the ending of frame transmission.

17. A method according to claim 16 wherein after all transceivers have ended frame transmission and all transmitters have indicated that they are no longer busy sending a frame after a Suspend command, allowing a step of sending a higher priority frame group after transmission of the current frame group is initiated whether or not a frame transmission has completed.

18. A method according to claim 16 wherein a transmission of a frame group can prematurely become ended as a result of an initiated Suspend command, as by an interrupt for a higher priority message, whereupon said busy bit for each transceiver has been reset, and wherein thereafter the transmission of said prematurely ended frame group is resumed after an intervening transmission, as a higher priority frame group transmission, has completed.

19. A method according to claim 14, wherein for suspending a frame group in an environment of multiple independent transceivers operating with independent clocks asynchronously broadcasting a suspend command in the event of a stall indication from a source to all transceivers instructing them to suspend a frame being currently transmitted; and receiving at each tranceiver the broadcast suspend command and determining on what block boundary within the frame to end the frame transmission; and ending the frame and returning to the source an indication of frame end, wherein, said suspend command is broadcast from said source upon a stall indication, and upon a indication received by the source that transmission of frames has ended, then broadcasting a resume command to all transceivers to instruct them to resume transmission.

20. A method according to claim 19 wherein after suspending transmission a frame group; performing the step of resuming transmission of the suspended frame group; wherein upon resumption of transmission of a suspended frame group a link-control word of a first frame of frame group being transmitted as a resuming transmission of the suspended frame group specifies where the information of the frame group being transmitted begins without resending any information previously sent in frame(s) previously transmitted before suspension of the suspended frame group.

21. A method according to claim 20 wherein is included asynchronously broadcasting a command from a source to all transceivers instructing them to suspend, or end, a frame being currently transmitted; and receiving at each tranceiver the broadcast command, and if the command is a suspend command, determining on what block boundary within the frame to end the frame transmission; and ending the frame and returning to the source an indication of frame end, whereby upon resume the source can supply for resumption of transmission a first frame upon resume transmission that specifies where a resumed transmission begins, whereby the information of the frame group being transmitted upon resumption begins without resending any information previously sent in frame(s) previously transmitted before suspension of the suspended frame group.

22. A communication system, comprising:

a plurality of communication nodes each having port means for communication to and from the node, communication means for passing information from the port means of one node to another node, including:

data frame storage means for storing in memory data frames be transmitted, and for transmitting in transmit mode a sending data frame having a beginning link-control word, and an information field and having some first priority between nodes of the computer system from at least one transmitting communicating node to at least one receiving communication node;

priority control means for determining the priority of frame transmission, and transmission means for transmitting in transmit mode data frames stored in memory from one node to another, said priority control means including means for suspending transmission of a data frame during transmit for a period of time for transmission of an interrupt message after which the transmission of data frames in transmit mode is resumed, said priority control means including means for interrupting the transmission of said transmit mode data frame and suspending its transmission at said first transmitting communicating node whether or not said first priority frame transmission has completed transmission of all of its information field and completed transmission of its frame without causing an error message or abortion of the sending data frame at a receiving communicating node and for transmitting a priority interrupt message frame while said transmit mode data frame is suspended, and after the priority interrupt message frame is transmitted, for resuming the transmission of said transmit mode data frame.

23. A communication system according to claim 22 wherein said priority control means includes a priority interrupt means for initiating a higher priority frame transmission than a data frame transmission in transmit mode and for transmitting a priority interrupt message in interrupt mode transmission during suspension; and then resuming said transmission in transmit mode at the level it was interrupted whereby transmission from the communication node to the receiving node is resumed without resending previously transmitted information.

24. A communication system according to claim 23 wherein said priority control means includes a suspend/resume state machine.

25. A communication system according to claim 24 wherein is included a link controller for managing transmission of link adapters, and said suspend/resume state machine controls ending of current transmitted frame groups and instructs the controller functions to send high priority frame groups, and resumes transmission for a prematurely ended buffer area, said suspend/resume state machine receiving instructions to send high priority frames and to move data from the link adapters to the system.

26. A communication system according to claim 25 wherein the controller has a counting mechanism for determining when an outbound frame transfer has stalled, including a stall counter, for counting the number of cycles that the controller is requesting data from the system and that data has not yet been delivered.

27. A communication system according to claim 25 wherein an outbound stall condition is detected only when transmitting functions are busy sending a frame and the data flow from the system has been slowed down for a relatively long time, whereupon the suspend/resume state machine immediately sends the suspend command to the transmitting functions which acknowledge that they have ended the frame by indicating that they are no longer busy, the condition being detected by a decision block, whereupon a resume command is immediately sent to restart transmission as soon as data is available from the system.

* * * * *